US008720844B2

(12) United States Patent
Westimayer et al.

(10) Patent No.: US 8,720,844 B2
(45) Date of Patent: May 13, 2014

(54) STRUCTURE FOR COUPLING ITEMS SUCH AS SIGNS AND CAMERAS TO A FIXED SUPPORT STRUCTURE

(76) Inventors: Anthony J. Westimayer, Horicon, WI (US); Monroe A Aubry, West Bend, WI (US)

(*) Notice: Subject to any disclaimer, the term of this patent is extended or adjusted under 35 U.S.C. 154(b) by 0 days.

(21) Appl. No.: 13/094,539

(22) Filed: Apr. 26, 2011

(65) Prior Publication Data

US 2011/0266406 A1 Nov. 3, 2011

Related U.S. Application Data

(60) Provisional application No. 61/343,411, filed on Apr. 28, 2010.

(51) Int. Cl.
*A47F 7/14* (2006.01)
*A47G 1/16* (2006.01)
*A47B 96/06* (2006.01)
*A47F 5/00* (2006.01)

(52) U.S. Cl.
USPC .......... 248/475.1; 248/218.4; 248/219.1; 248/219.2; 248/219.3; 248/488; 248/489; 248/300; 40/606.01; 40/607.01; 40/611.01; 40/611.05; 40/757; 40/606.14; 40/759; 40/209

(58) Field of Classification Search
USPC .......... 248/475.1, 218.4, 219.1, 219.2, 219.3, 248/495–496, 470, 476, 488, 489, 300; 40/606.01, 607.01, 611.01, 611.05, 40/757, 606.14, 759, 209; 29/521, 428
See application file for complete search history.

(56) References Cited

U.S. PATENT DOCUMENTS

| 3,360,876 | A | | 1/1968 | Nestegard |
| 3,461,584 | A | | 8/1969 | Wilson |
| 3,517,905 | A | | 6/1970 | Nestegard |
| 3,552,702 | A | | 1/1971 | Springer |
| 3,608,220 | A | * | 9/1971 | Fryrear ............... 40/606.12 |
| 3,728,806 | A | | 4/1973 | Kostiuk |
| 3,750,314 | A | | 8/1973 | Crawford |
| 3,815,860 | A | | 6/1974 | Bompart |
| 3,880,395 | A | | 4/1975 | Bompart |
| 3,969,838 | A | | 7/1976 | Moore |
| 4,038,769 | A | | 8/1977 | Werner |
| 4,063,614 | A | | 12/1977 | Iven |
| D246,814 | S | | 1/1978 | Peggs |
| 4,078,754 | A | | 3/1978 | Gould |
| 4,101,023 | A | | 7/1978 | Schuander |
| 4,106,229 | A | | 8/1978 | Schmid |
| D249,905 | S | | 10/1978 | Galazzo |
| 4,125,243 | A | | 11/1978 | Liptak |
| D254,624 | S | | 4/1980 | Stenersen |

(Continued)

OTHER PUBLICATIONS

Catalog, EverMark Marking Systems, 2010, 16 pages.

(Continued)

*Primary Examiner* — Terrell McKinnon
*Assistant Examiner* — Christopher Garft
(74) *Attorney, Agent, or Firm* — Ryan Kromholz & Manion, S.C.

(57) ABSTRACT

A structure is provided for coupling items such as signs, birdhouses and cameras to a fixed support structure is disclosed. Various mechanisms for attachment to a variety of supporting structures are described. The structure firmly holds an item in place, and the structure is capable of secure attachment to a variety of supporting structures.

1 Claim, 6 Drawing Sheets

(56) References Cited

U.S. PATENT DOCUMENTS

| | | |
|---|---|---|
| D254,625 S | 4/1980 | Stenersen |
| 4,208,818 A | 6/1980 | Butcher |
| 4,219,179 A | 8/1980 | Silbernagel |
| 4,258,492 A | 3/1981 | Williams |
| 4,262,438 A | 4/1981 | Scherer |
| D259,081 S | 5/1981 | Sharpless, Jr. et al. |
| 4,271,616 A | 6/1981 | Boykin |
| 4,309,836 A | 1/1982 | Knapp |
| D265,485 S | 7/1982 | Liptak |
| D267,416 S | 12/1982 | Liptak et al. |
| 4,387,520 A | 6/1983 | Ahrens |
| 4,412,396 A | 11/1983 | Silbernagel |
| 4,466,592 A | 8/1984 | Janson |
| D276,390 S | 11/1984 | Karlsson |
| 4,537,316 A | 8/1985 | Simon et al. |
| 4,557,063 A | 12/1985 | Bloom |
| D286,371 S | 10/1986 | Shuman |
| 4,628,624 A | 12/1986 | Gunn |
| 4,658,527 A | 4/1987 | Pingel |
| 4,667,428 A | 5/1987 | Elmer |
| D290,620 S | 6/1987 | Elmer |
| 4,677,780 A | 7/1987 | Shuman |
| 4,698,928 A | 10/1987 | Soporowski |
| 4,704,813 A * | 11/1987 | Fast ............................ 40/661.08 |
| 4,706,400 A * | 11/1987 | Howard et al. .................. 40/617 |
| 4,711,367 A * | 12/1987 | Albertson ................. 229/117.12 |
| D295,194 S | 4/1988 | McCormick |
| 4,753,027 A | 6/1988 | Dahl |
| 4,777,750 A | 10/1988 | Garfinkle |
| 4,793,083 A | 12/1988 | McDonald |
| 4,798,013 A | 1/1989 | Sainato |
| 4,827,646 A | 5/1989 | Miller et al. |
| 4,835,889 A | 6/1989 | McClymonds |
| 4,854,533 A | 8/1989 | Sainato |
| 4,881,707 A | 11/1989 | Garfinkle |
| 4,903,423 A | 2/1990 | Hinca |
| 4,909,464 A | 3/1990 | Levine et al. |
| D307,448 S | 4/1990 | Akard |
| 4,917,342 A | 4/1990 | Fast |
| 4,955,153 A | 9/1990 | Albrecht et al. |
| 4,960,258 A | 10/1990 | Stocker et al. |
| D311,933 S | 11/1990 | Adams |
| 4,995,182 A | 2/1991 | Fast |
| 5,029,378 A | 7/1991 | Stocker et al. |
| 5,044,103 A | 9/1991 | Izenberg |
| D322,634 S | 12/1991 | Callas |
| D327,333 S | 6/1992 | Elmer |
| D328,143 S | 7/1992 | Elmer |
| 5,134,794 A | 8/1992 | Walrath |
| 5,136,557 A | 8/1992 | Plawker et al. |
| 5,188,332 A | 2/1993 | Callas |
| D334,217 S | 3/1993 | Minehart |
| D336,414 S | 6/1993 | Bouchelle |
| D336,931 S | 6/1993 | McDonald |
| D342,285 S | 12/1993 | Boyar |
| D342,286 S | 12/1993 | Orsos |
| D342,434 S | 12/1993 | Glynn |
| D342,549 S | 12/1993 | Hofman |
| D342,659 S | 12/1993 | Glynn |
| D344,226 S | 2/1994 | Glynn |
| D344,294 S | 2/1994 | Foust |
| D344,672 S | 3/1994 | Current |
| D345,766 S | 4/1994 | Goldman et al. |
| 5,305,978 A | 4/1994 | Current |
| D346,624 S | 5/1994 | Skarin |
| D347,244 S | 5/1994 | Whitmire |
| D347,659 S | 6/1994 | Taylor |
| D347,660 S | 6/1994 | Kaplan |
| D347,859 S | 6/1994 | Glynn |
| D353,627 S | 12/1994 | McCormick |
| D354,991 S | 1/1995 | DeSutter |
| D356,341 S | 3/1995 | Glynn |
| D357,505 S | 4/1995 | Callas |
| 5,408,774 A | 4/1995 | Grewe et al. |
| D358,971 S | 6/1995 | Glynn |
| D363,951 S | 11/1995 | Chatman |
| 5,472,163 A | 12/1995 | Callas |
| D366,066 S | 1/1996 | Callas |
| 5,480,116 A | 1/1996 | Callas |
| D372,939 S | 8/1996 | Callas |
| D375,980 S | 11/1996 | Current |
| 5,615,503 A | 4/1997 | Current |
| 5,618,141 A | 4/1997 | Field |
| D379,199 S | 5/1997 | Sandy |
| D379,201 S | 5/1997 | Sandy |
| D384,374 S | 9/1997 | Sandy |
| 5,678,794 A | 10/1997 | Kump |
| D386,531 S | 11/1997 | Callas |
| 5,682,698 A | 11/1997 | Bevins |
| 5,701,695 A | 12/1997 | Current |
| D388,834 S | 1/1998 | Sandy |
| D389,526 S | 1/1998 | Callas |
| 5,718,072 A | 2/1998 | Garfinkle |
| D393,490 S | 4/1998 | Burch |
| D395,680 S | 6/1998 | Sandy |
| 5,781,980 A | 7/1998 | Golston |
| 5,806,823 A | 9/1998 | Callas |
| D399,397 S | 10/1998 | Callas |
| 5,826,358 A | 10/1998 | DeSutter |
| 5,836,097 A | 11/1998 | Lewis et al. |
| D407,987 S | 4/1999 | Dittmore et al. |
| 5,901,482 A * | 5/1999 | Sawyer et al. .................. 40/308 |
| 5,906,064 A | 5/1999 | Field |
| 5,992,806 A | 11/1999 | Adams |
| D417,437 S | 12/1999 | Kim |
| 5,996,264 A | 12/1999 | Nagel |
| 6,003,827 A | 12/1999 | Kulp et al. |
| D418,878 S | 1/2000 | Donahue |
| D422,642 S | 4/2000 | Pugliese |
| 6,052,067 A | 4/2000 | Noxoll |
| D424,121 S | 5/2000 | Kump |
| D425,134 S | 5/2000 | Kump |
| D425,565 S | 5/2000 | Bowie |
| D425,939 S | 5/2000 | Kump et al. |
| 6,065,233 A | 5/2000 | Rink |
| D427,642 S | 7/2000 | Pugliese |
| D434,082 S | 11/2000 | Tsiogas |
| 6,145,232 A | 11/2000 | Bevins |
| 6,163,996 A | 12/2000 | Gebka |
| 6,186,454 B1 | 2/2001 | Olsen |
| 6,189,488 B1 * | 2/2001 | Goldsher et al. ................. 119/72 |
| 6,276,084 B1 | 8/2001 | Lanier |
| D451,703 S | 12/2001 | All |
| D453,534 S | 2/2002 | Kosir |
| D453,798 S | 2/2002 | Gray |
| D454,373 S | 3/2002 | Kosir |
| D454,593 S | 3/2002 | Kosir |
| D454,917 S | 3/2002 | Mueller |
| D454,918 S | 3/2002 | Wamsley et al. |
| 6,354,546 B1 | 3/2002 | Mueller |
| 6,357,711 B1 | 3/2002 | Heyderman et al. |
| 6,364,137 B1 | 4/2002 | Glauth et al. |
| 6,386,492 B1 | 5/2002 | Brown et al. |
| 6,389,723 B1 | 5/2002 | Rink, Jr. |
| D461,977 S | 8/2002 | Mitchell |
| 6,493,974 B2 | 12/2002 | Tramont |
| 6,530,166 B1 | 3/2003 | Garfinkle et al. |
| 6,550,731 B1 | 4/2003 | Kim |
| 6,568,112 B2 | 5/2003 | Lowry et al. |
| D476,040 S | 6/2003 | LeKay |
| D476,373 S | 6/2003 | Blasbalg |
| 6,581,314 B2 | 6/2003 | Valiulis |
| 6,588,135 B1 | 7/2003 | LeKay |
| 6,651,369 B1 | 11/2003 | Keating et al. |
| D487,115 S | 2/2004 | Kosir |
| 6,688,567 B2 | 2/2004 | Fast et al. |
| 6,698,124 B1 | 3/2004 | Kump et al. |
| 6,708,436 B2 | 3/2004 | Nagel |
| D488,627 S | 4/2004 | Stravitz |
| 6,722,067 B1 * | 4/2004 | Kennedy et al. ........... 40/606.19 |
| 6,722,069 B1 | 4/2004 | Lanier |
| 6,739,567 B1 | 5/2004 | Curtis |
| 6,766,992 B1 * | 7/2004 | Parker ........................ 248/300 |
| 6,779,287 B2 | 8/2004 | Venegas, Jr. |

(56) References Cited

U.S. PATENT DOCUMENTS

| | | |
|---|---|---|
| D496,693 S | 9/2004 | Mueller |
| 6,823,620 B2 | 11/2004 | Nagel |
| D504,021 S | 4/2005 | Stravitz |
| D505,018 S | 5/2005 | Stravitz |
| D507,118 S | 7/2005 | Stravitz |
| D508,960 S | 8/2005 | Mueller |
| D511,548 S | 11/2005 | Wamsley |
| 6,976,331 B2 | 12/2005 | Fast |
| 6,976,660 B2 * | 12/2005 | Lapointe et al. ............ 248/218.4 |
| 6,996,928 B1 * | 2/2006 | Lux et al. ................... 40/611.11 |
| 7,036,255 B1 | 5/2006 | Santana et al. |
| 7,053,300 B2 * | 5/2006 | Denier et al. .................... 174/58 |
| D522,585 S | 6/2006 | Frey |
| 7,055,274 B2 | 6/2006 | Fast et al. |
| 7,114,277 B2 | 10/2006 | Valiulis et al. |
| 7,131,225 B2 | 11/2006 | Wu |
| 7,134,232 B2 | 11/2006 | Stravitz |
| 7,137,606 B2 | 11/2006 | Conway et al. |
| D533,230 S | 12/2006 | Thomas |
| D534,219 S | 12/2006 | Seljeseth et al. |
| 7,143,534 B2 | 12/2006 | Kaminski |
| D537,123 S | 2/2007 | Thomas |
| 7,216,445 B2 | 5/2007 | Bruegmann |
| 7,219,459 B2 | 5/2007 | Valiulis et al. |
| 7,228,654 B2 | 6/2007 | Stravitz |
| 7,243,449 B2 | 7/2007 | Wichmann |
| 7,258,315 B2 | 8/2007 | Wamsley |
| D551,717 S | 9/2007 | Diller |
| D551,718 S | 9/2007 | Diller |
| 7,322,138 B2 | 1/2008 | Gormley et al. |
| 7,328,942 B1 | 2/2008 | Wu |
| 7,340,855 B2 | 3/2008 | Wiltfang et al. |
| 7,350,324 B2 | 4/2008 | Wu |
| D573,657 S | 7/2008 | Caterinacci |
| D577,075 S | 9/2008 | Bode |
| 7,490,424 B2 | 2/2009 | Caterinacci |
| D598,217 S | 8/2009 | Bode |
| D602,094 S | 10/2009 | Nowatzke |
| D608,836 S | 1/2010 | Kosir |
| 7,641,061 B1 * | 1/2010 | Cuzzocrea ..................... 211/113 |
| 7,644,527 B2 | 1/2010 | Clark et al. |
| 7,673,409 B2 | 3/2010 | Pitcher et al. |
| 2001/0039750 A1 | 11/2001 | Venegas, Jr. |
| 2002/0020095 A1 | 2/2002 | Kump et al. |
| 2002/0026737 A1 | 3/2002 | Tramont |
| 2002/0083628 A1 * | 7/2002 | Magid ............................ 40/308 |
| 2002/0166275 A1 | 11/2002 | Broadwell et al. |
| 2002/0174582 A1 | 11/2002 | Garfinkle et al. |
| 2002/0178630 A1 | 12/2002 | Valiulis |
| 2003/0014893 A1 | 1/2003 | Lowry |
| 2003/0019140 A1 | 1/2003 | Lowry et al. |
| 2003/0019988 A1 | 1/2003 | Barber |
| 2003/0098400 A1 | 5/2003 | Fast et al. |
| 2003/0159322 A1 | 8/2003 | Mead |
| 2003/0182835 A1 | 10/2003 | Nagel |
| 2003/0196356 A1 | 10/2003 | Wu |
| 2003/0217497 A1 | 11/2003 | Nagel |
| 2004/0050812 A1 | 3/2004 | Rojas et al. |
| 2004/0055983 A1 | 3/2004 | Fast |
| 2004/0255500 A1 | 12/2004 | Fast et al. |
| 2005/0050783 A1 | 3/2005 | Wichmann |
| 2005/0091893 A1 | 5/2005 | Bruegmann |
| 2005/0097796 A1 | 5/2005 | Kaminski |
| 2005/0160646 A1 | 7/2005 | DeSalle |
| 2005/0167555 A1 | 8/2005 | Wamsley |
| 2005/0204965 A1 | 9/2005 | Fast |
| 2005/0247780 A1 | 11/2005 | Lowry |
| 2005/0268507 A1 | 12/2005 | Valiulis et al. |
| 2005/0269466 A1 | 12/2005 | Conway et al. |
| 2005/0274052 A1 | 12/2005 | Valiulis et al. |
| 2006/0053670 A1 | 3/2006 | Wiltfang et al. |
| 2006/0070272 A1 | 4/2006 | Visola |
| 2006/0130381 A1 | 6/2006 | Caterinacci |
| 2006/0284033 A1 | 12/2006 | Wallis |
| 2007/0044361 A1 | 3/2007 | Gormley et al. |
| 2007/0119083 A1 | 5/2007 | Diller |
| 2008/0006693 A1 | 1/2008 | Gustafson |
| 2008/0028652 A1 | 2/2008 | Makhija et al. |
| 2008/0178506 A1 | 7/2008 | Garfinkle |
| 2009/0013572 A1 | 1/2009 | Clark et al. |
| 2009/0031600 A1 | 2/2009 | Anderson, II et al. |
| 2009/0056185 A1 | 3/2009 | Wamsley |
| 2009/0056187 A1 | 3/2009 | Pitcher et al. |
| 2009/0165346 A1 | 7/2009 | Garfinkle |
| 2009/0205232 A1 | 8/2009 | Healy |
| 2009/0217561 A1 | 9/2009 | Thompson |
| 2009/0230266 A1 * | 9/2009 | Hillstrom et al. .......... 248/230.9 |
| 2010/0065697 A1 | 3/2010 | Howlett |
| 2010/0083544 A1 | 4/2010 | Shirley et al. |

OTHER PUBLICATIONS

Catalog, EverMark Marking Systems, 2010, 8 pages.

* cited by examiner

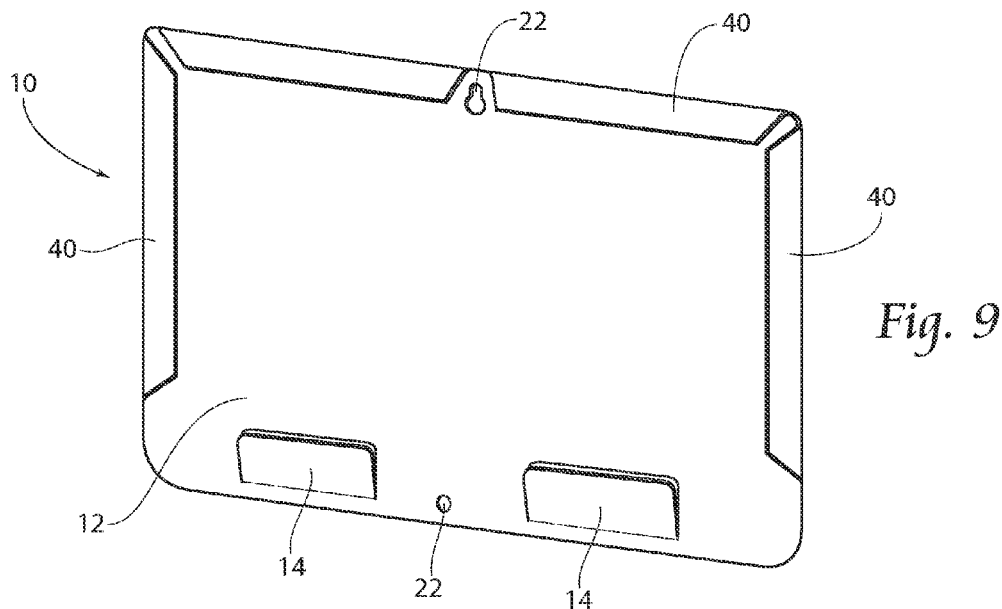
*Fig. 9*
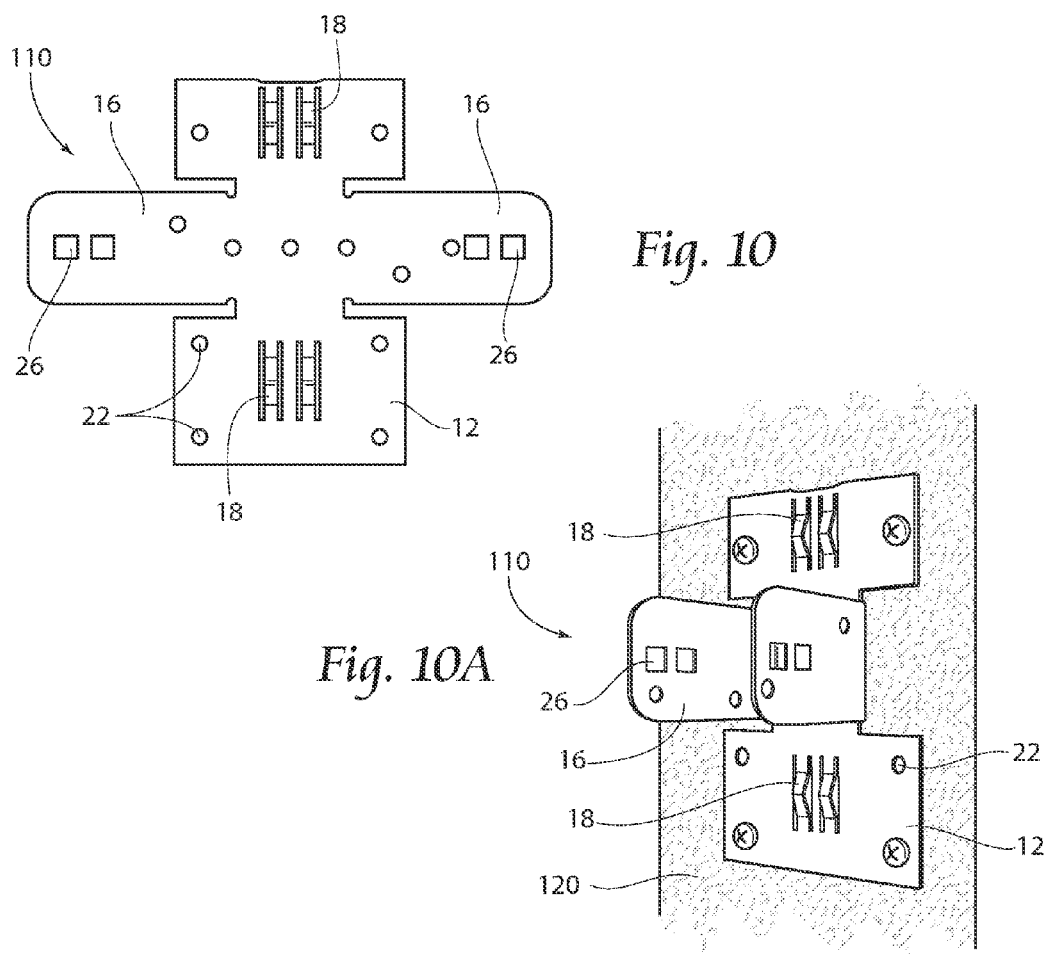
*Fig. 10*
*Fig. 10A*

STRUCTURE FOR COUPLING ITEMS SUCH AS SIGNS AND CAMERAS TO A FIXED SUPPORT STRUCTURE

RELATED APPLICATIONS

This application claims the benefit of U.S. Provisional Patent Application Ser. No. 61/343,411; filed 28 Apr. 2010.

BACKGROUND OF THE INVENTION

This invention relates to structures used for holding or carrying items in place, such as signs (For Sale, For Rent, Beware of Dog, No Trespassing, No Hunting), birdhouses, bird feeders, trail cameras, or anything else that desired to be mounted in a fixed position.

Signs such as these often are meant to be displayed at or near eye-level on various support structures. Often metal sign poles are used, as well as fences, fence posts, wood posts, or trees. Signs are often exposed to weather, and therefore a sturdy holder is desired to hold signs in place during weather. It is also desired to have a sign holder that easily permits installation of the sign into the sign holder, and easily permits installation of the sign holder onto the support structure. It is also desirable to have a sign holder capable of being coupled with a variety of support structures to be more universal in application.

Also, signs nailed to a tree without sufficient support allows the wind to tear them off. Many people purchase plywood or lumber, cut it slightly larger than the sign and staple or nail them to the wood. This procedure is labor intensive, and many people do not have the skills or tools to do this, and the wind tears these off as well.

SUMMARY OF THE INVENTION

Disclosed is a one-piece sign holder that will quickly and easily accept signs of various sizes and shapes, and the sign holder can be easily attached to various support structures, such as flat surfaces, metal sign poles, "T" shaped fence posts, round posts, fences, fence posts, wood posts, chain link fence, or trees.

A series of void spaces are provided on the base sign holder, some used for receiving the sign itself, others used to secure the sign holder to the various support structure. For instance, holes are provided at the top and bottom and can be used for nails or deck type screws, square void spaces and slots can be used with carriage bolts for securement to any posts, and tab-like structures are provided that can be bent out if needed for the particular purpose employed. Also, lanced "v" tabs can be supplied which allow for mounting and centering on "tee" types of posts.

The ease of use, and universal adaptability are evident. Sign holders of the present invention also allow for easy removal and replacement of the signs in the event that they become weathered, faded, cracked, etc.

Also evident is that sign holders of the present invention have the ability to be formed into an arc shape to allow for more visibility from the side angles.

The sign holder can be used or modified to hold additional items (other than, or in addition to signs), such as birdhouses, bird feeders, trail cameras, or anything else that is mounted in a fixed position. These embodiments can be provided with auxiliary features such as a brackets and shelves, to add to the versatility of the sign holder.

BRIEF DESCRIPTION OF THE DRAWINGS

FIG. 9 is a perspective view of an alternate embodiment of a sign holder of the present invention.

FIG. 10 is a plan view of a second alternate embodiment of the present invention, the second alternate embodiment used to carry a structure such as a bird house.

FIG. 10*a* is a perspective view of the second alternate embodiment of the present invention, secured to a bird house structure;

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
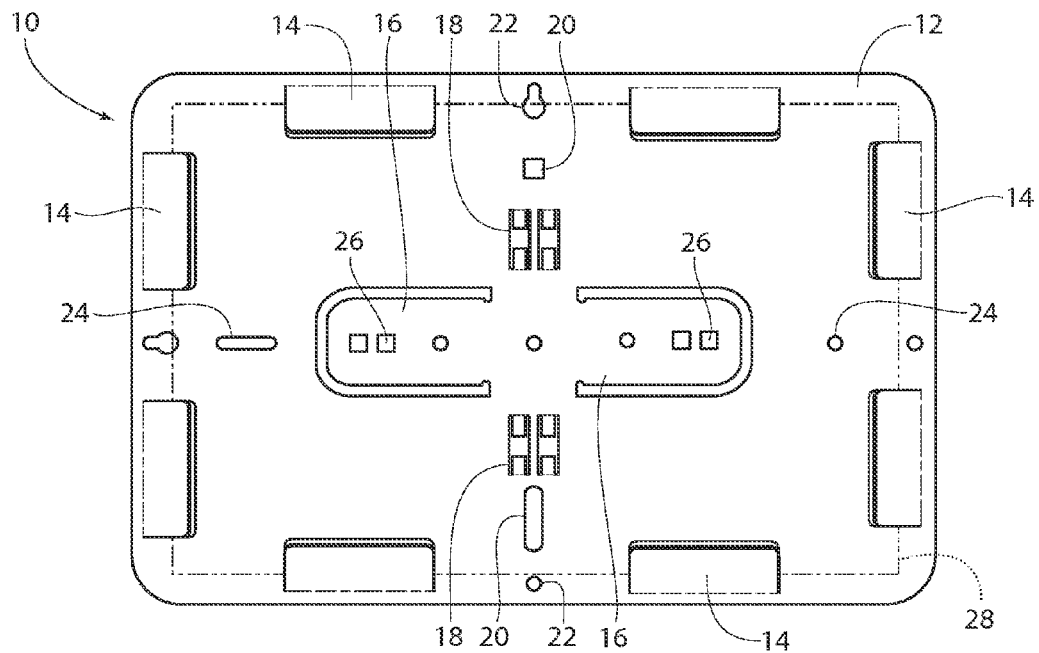
FIG. 1 is a front view of a sign holder of the present invention.
Figure 2:
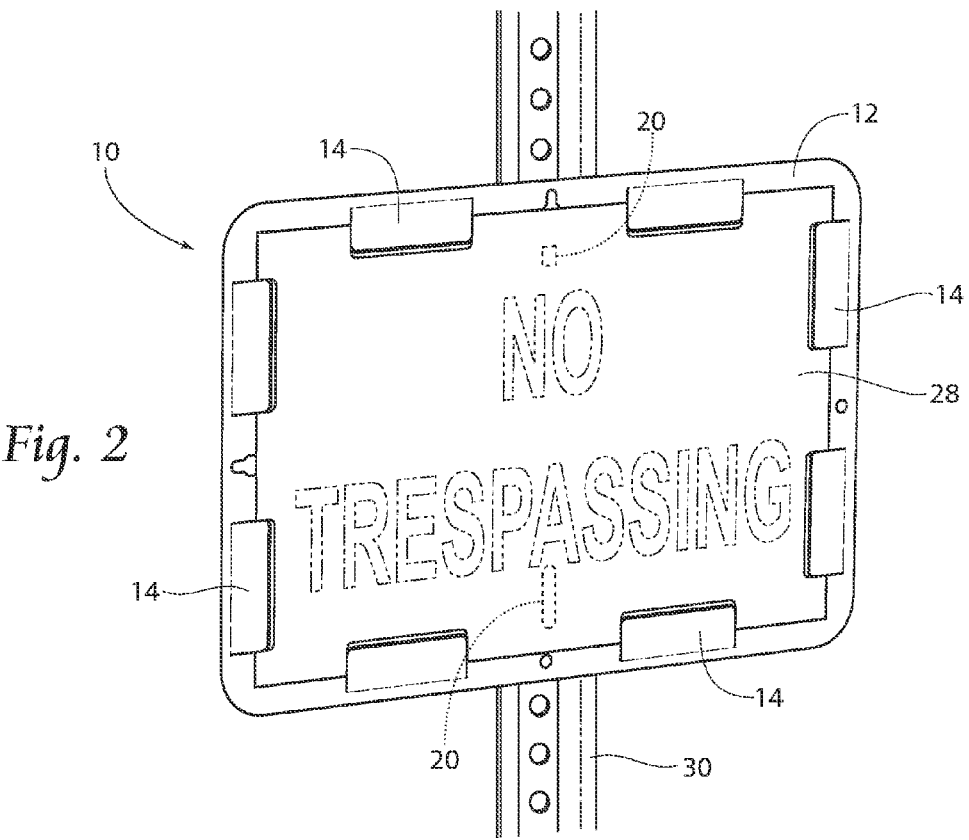
FIG. 2 is a front, in use view of a sign holder of the present invention deployed on a metal post-type support structure.

Referring now to FIG. 1, a front view of a sign holder 10 of the present invention is shown. A series of 8 (more or less can be used) tabs or sign retaining lances 14 are shown in raised position relative the generally initially flat structure of base material 12 of the sign holder 10. Preferably the sign holder 10 is made of a flexible material such as sheet metal (the device being formed by punching, cutting, bending etc.) or plastic (the device being formed by methods such as molding or cutting), but other materials can be used. The tabs 14 are for receiving a sign 28 as shown in FIG. 2. The sign 28 is placed within the tabs 14 and the tabs 14 can be depressed back into generally planar formation to hold the sign 28 securely.

In addition to tabs provided on the sign holder to secure the sign, other types of securement means for securing the sign to the sign holder could be used. For instance, lances 18 could be employed, or folded over edges (see FIG. 9, item 40) provided on the sign holder 10, or a combination of them (folded top, sides, and lances on the bottom; or other similar arrangements). The sign holder can be made in various sizes to accommodate signs of different sizes. Also, one sign holder can be provided with a plurality of sign securement mechanisms at various distances from the center or various geometries, to hold different sized or shaped signs.

Also evident from FIG. 1 are a variety of additional void spaces used to secure the sign holder to various support structures as will be described later. Some of the void spaces, such as "C" shaped slots, are designed for bending about support structures to form post attaching tabs 16. Others are circular or light-bulb shaped voids 22 and are designed for securement with nails or screws to wooden support structures. Square void spaces 26 can be used with carriage bolts (described later) for securement to posts. Also, lanced "v" tabs 18 can be supplied which allow for mounting and centering on "tee" types of posts. Bolt on metal post mounts 20 can comprise a hole and a slot, and chain link fence mounting holes 24 can also comprise a hole shape and a slot shape.

Figure 3:
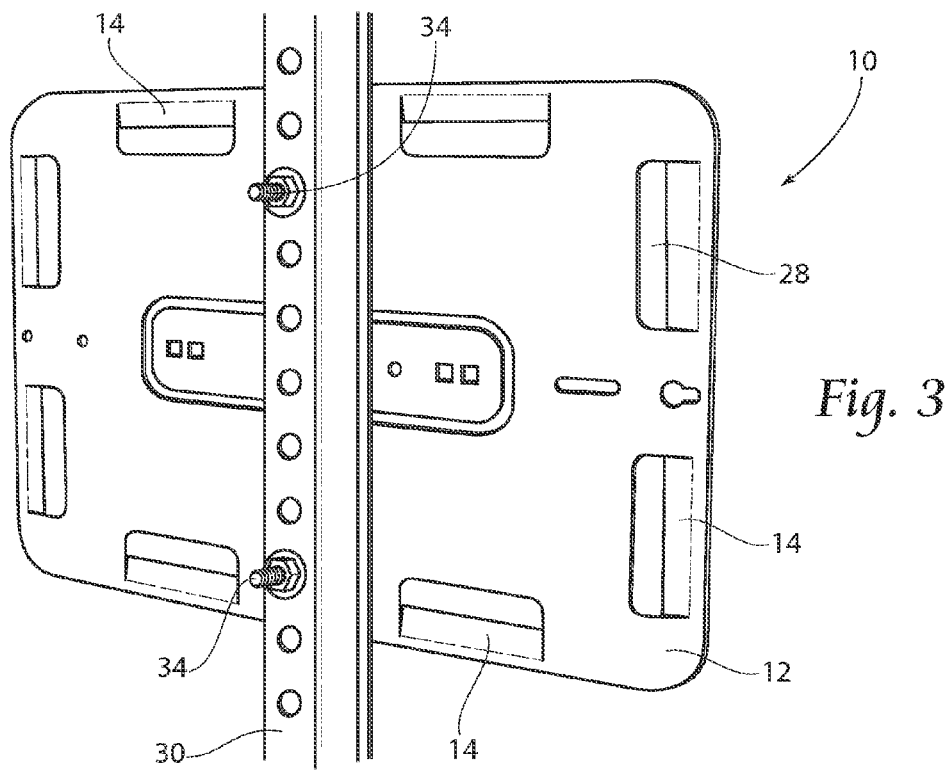
FIG. 3 is a rear, in use view of a sign holder of the present invention deployed on a post-type support structure.

Referring now to FIG. 2, a front, in use view of a sign holder 10 holding an illustrative sign 28 (with lance tabs 14) on a metal post-type support structure 30 is shown. In this embodiment, as shown in the rear view of FIG. 3, a pair of the circular or square type void spaces 20 from FIG. 1 are used with nuts and bolts 34 to deploy the sign holder of the present invention to deploy on a post-type support structure 30 after bending tabs 16 backwards.

Figure 4:
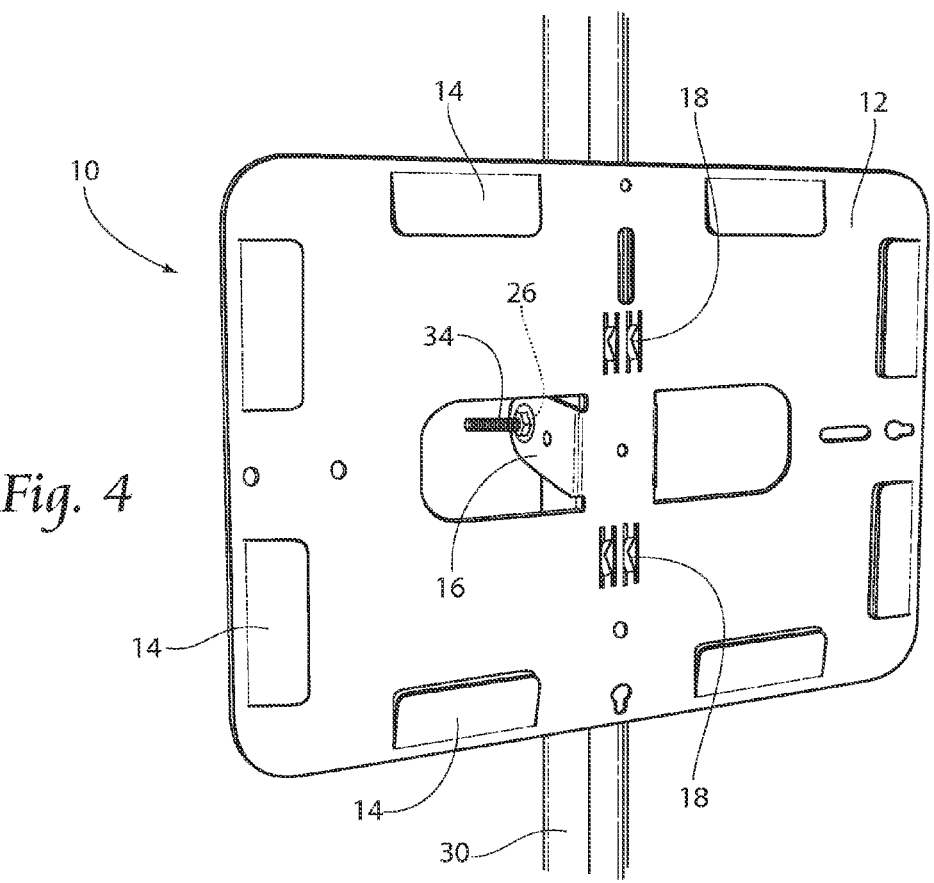
FIG. 4 is a front, in use view of a sign holder of the present invention deployed on a post-type support structure with an alternate attachment means provided.
Figure 5:
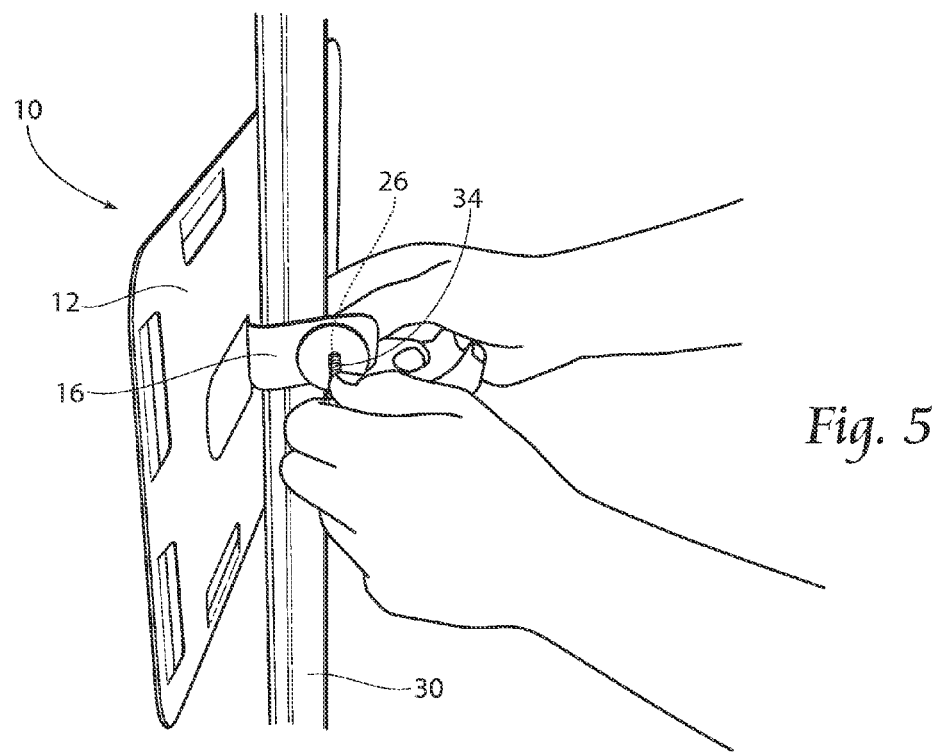
FIG. 5 is a side, installation view of a sign holder of the present invention being deployed on a post-type support structure using the alternate attachment means provided.

Referring now to FIG. 4, a front, in use view of a sign holder 10 of the present invention is shown deployed on a post-type support structure 30. In this illustration, the alternate "C" shaped attachment means forming post attaching tabs 16 have been bent about a support structure 30 and secured thereto, with nuts and bolts 34 provided through voids 26 within the alternate "C" shaped attachment means itself, in the manner illustrated by FIG. 5.

Figure 6:
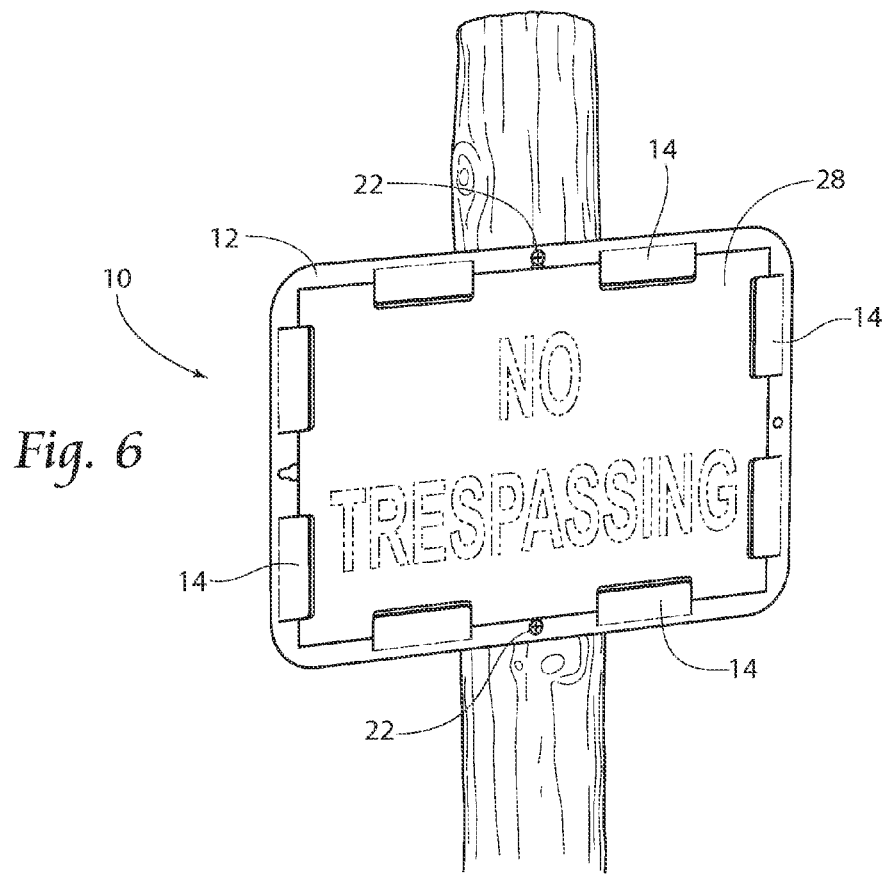
FIG. 6 is a front view of a sign holder of the present invention deployed on a wooden post-type support structure.

Referring now to FIG. 6, a front view of a sign holder 10 of the present invention is shown deployed on a wooden post-type support structure 30, with traditional wood screws applied through a pair of void spaces 22 at the top and the bottom of the sign holder 10.

Figure 7:
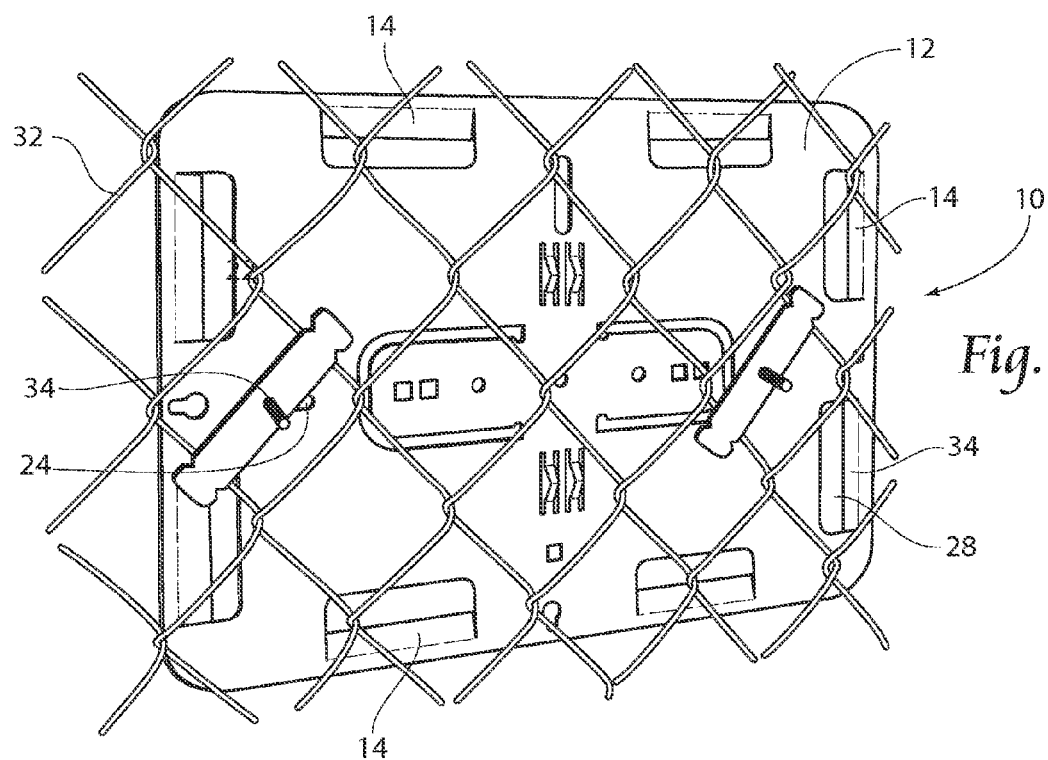
FIG. 7 is a rear view of a sign holder of the present invention deployed on a chain-link fence support structure.

Referring now to FIG. 7, a rear view of a sign holder 10 of the present invention is shown deployed on a chain-link fence support structure 32. As can be seen, the sign holder 10 is secured to the chain of the chain-link fence by deploying detachable tabs 34 across and behind the chain 32, coupled to the sign holder 10 with a bolt, through void spaces 24 in front of the sign holder 10.

Figure 8:
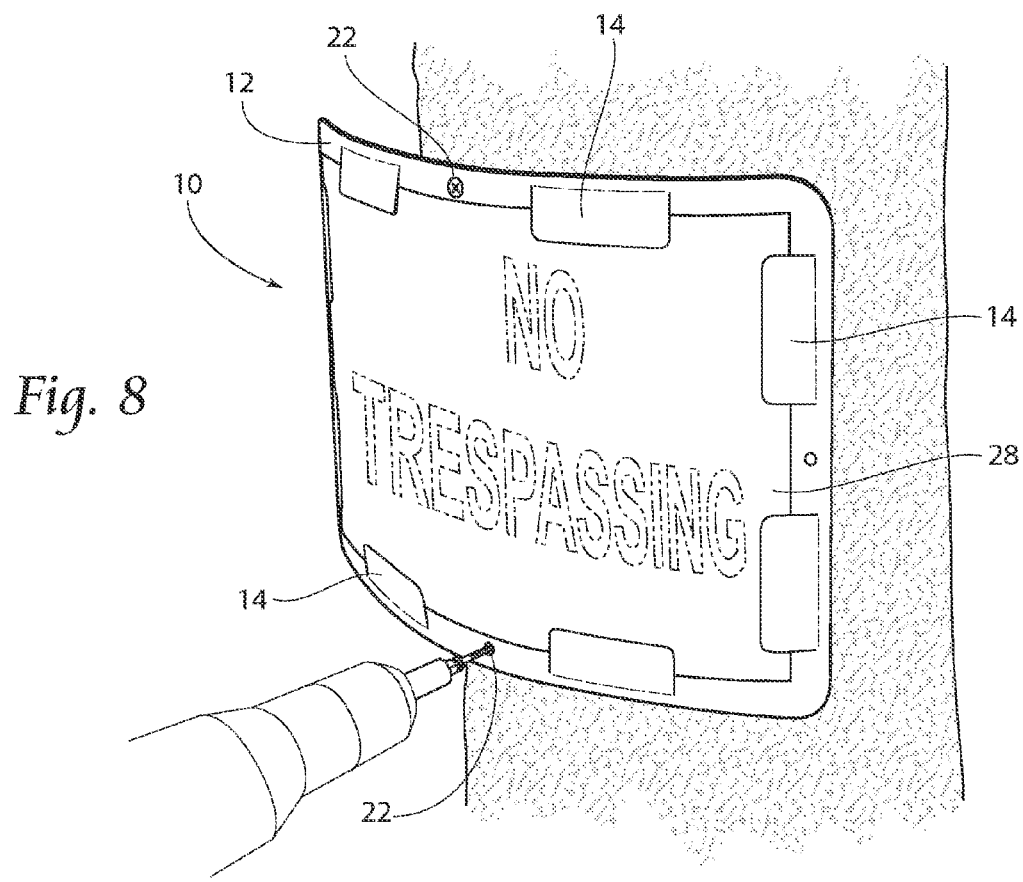
FIG. 8 is a front view of a sign holder of the present invention deployed on a tree in a curved deployment position.

Referring now to FIG. 8, a front view of a sign holder 10 of the present invention is shown deployed on a tree in a curved deployment position. This deployment position allows for increased lateral visibility, and decreased exposed surface area to minimize wind forces from dislodging the support structure from the tree.

Referring now to FIG. 9, a perspective view of an alternate embodiment of a sign holder 10 of the present invention is shown. In this embodiment, bent edges 40 are used as a sign retaining mechanism. These edges 40 can be used in combination with sign retaining lances 14, and the sign holder 10 can be provided with similar void spaces and attaching mechanisms as shown in the embodiment of FIG. 1.

Figure 10B:
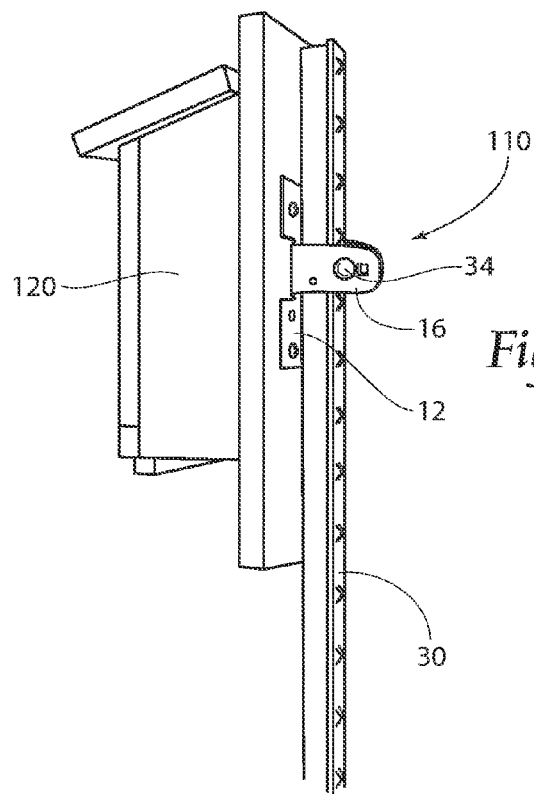
FIG. 10*b* is a rear perspective view of the second alternate embodiment of the present invention, secured to a bird house structure and secured to a support structure.

Referring now to FIGS. 10, 10a and 10B a second alternate embodiment of a carrying structure 110 is shown, in this case the structure 110 coupling a bird house 120 with a support structure 30. The structure 110 can be provided in a flat condition, and a user can bend tabs 16 up to attach the structure 110 to support structure 30. A flat initial condition allows for better packaging, shipping and store shelf usage.

Referring now specifically to FIGS. 10a and 10b, the structure 100 is shown first secured to a bird house structure 110, and the bird house 110 and the structure 100 are both coupled to a support structure or post 30.

Referring now to FIG. 10b, a rear perspective view of a second alternate embodiment of a carrying structure 110 is shown, the second alternate embodiment used to carry a structure such as a bird house 12. Like the previously described embodiments, the holder 110 can be affixed to a support structure or post 30. In this embodiment, fold out tabs 16 are expressed outwardly to provide a secure surface against which the bird house 110 can be coupled, for instance by use of wood screws through void spaces 26 in the fold out tabs 16.

Figure 11:
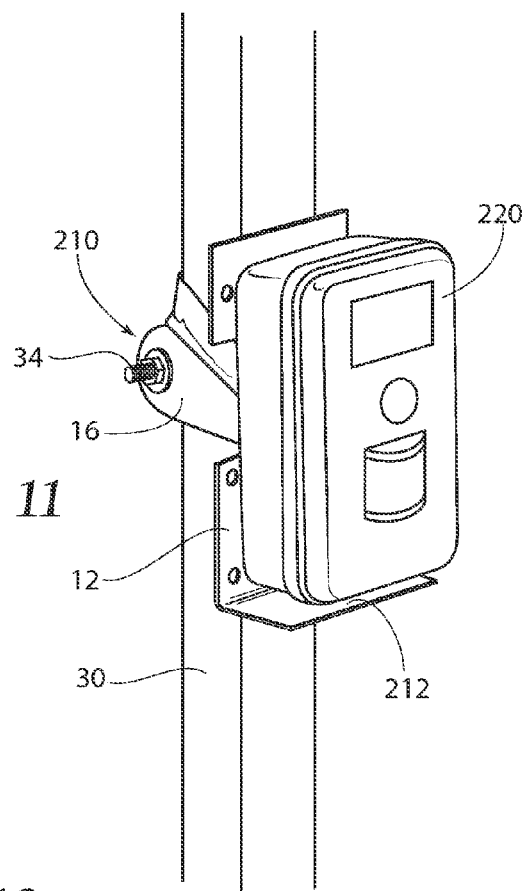
FIG. 11 is a front perspective view of a third alternate embodiment of the present invention, the third alternate embodiment used to carry a structure such as a trail camera.
Figure 12:
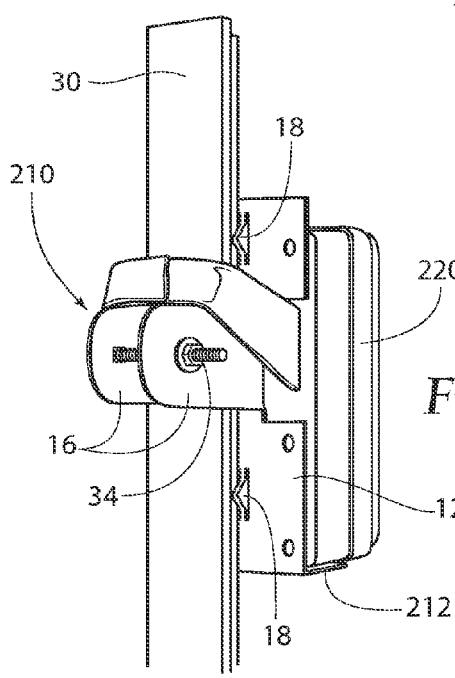
FIG. 12 is a rear perspective view of the embodiment shown in FIG. 11.

Referring now to FIGS. 11 and 12, front and rear perspective views of a third alternate embodiment 210 of the present invention are shown, the third alternate embodiment 210 used to carry a structure such as a trail camera 220. In this embodiment, a shelf 212 is provided to provide additional carrying structure for devices that are not readily susceptible to placing screws or bolts into. A camera, for example, is better suited to be carried by a belt or a shelf than to be screwed into.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A carrying device for mounting on a support structure and for carrying a carried structure, the carrying device comprising:
    a sheet of base material comprising an outward face and an inward face, top, bottom, right side and left side edges and interior surfaces on said outward face and said inward face inboard of said side edges;
    a plurality of centering tabs formed from said interior surface of said base material and projecting from said inward face;
    a plurality of structure engaging tabs;
    a plurality of mounting holes for coupling said carrying device and said carried structure;
    a plurality of void spaces for mounting said carrying device onto said support structure or for mounting said carried structure onto said device;
    a plurality of post mounting tabs formed from and depending from said interior surface of said base material, said post mounting tabs selectively bendable about said support structure and hinging about a center portion of said sheet of base material with free ends of said post mounting tabs free to rotate about said center;
    said post mounting tabs having a void space for receiving a coupling device, and together with said plurality of post mounting tabs, said coupling device and said plurality of post mounting tabs encircling said support structure;
    a plurality of carried structure retaining lances positioned adjacent to said top, bottom, right side and left side edges formed from and depending from said interior surface of said base material and projecting from said outward face, said structure retaining lances oriented on said bottom edge to receive and support said carried structure from a top vertical direction, oriented on said top edge to receive and support said carried structure from a bottom vertical direction, and oriented on said right side edge to receive said carried structure from a left direction, and oriented on left side edge to receive said carried structure from a right direction.

* * * * *